(12) United States Patent
Cheng

(10) Patent No.: US 6,970,081 B1
(45) Date of Patent: *Nov. 29, 2005

(54) DISTRIBUTED SOFTWARE CONTROLLED THEFT DETECTION

(75) Inventor: Doreen Y. Cheng, Los Altos, CA (US)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 884 days.

(21) Appl. No.: 09/176,171

(22) Filed: Oct. 21, 1998

Related U.S. Application Data

(60) Provisional application No. 60/100,826, filed on Sep. 17, 1998.

(51) Int. Cl.$^7$ .............................................. G08B 13/00
(52) U.S. Cl. ........................ 340/541; 340/521; 340/531
(58) Field of Search ............................. 340/541, 568.1, 340/568.2, 540, 548, 521, 522, 531, 533, 340/572.1, 572.4, 571, 310.06, 310.08, 825, 340/5.33, 506

(56) References Cited

U.S. PATENT DOCUMENTS

| | | | | |
|---|---|---|---|---|
| 4,661,804 A | * | 4/1987 | Abel | 340/539 |
| 4,703,306 A | * | 10/1987 | Barritt | 340/310.01 |
| 5,021,916 A | | 6/1991 | Hubbard | 361/171 |
| 5,142,269 A | | 8/1992 | Mueller | 340/568 |
| 5,406,260 A | | 4/1995 | Cummings et al. | 340/568 |
| 5,406,261 A | * | 4/1995 | Glenn | 340/571 |
| 5,420,573 A | * | 5/1995 | Tanaka et al. | 340/825.24 |
| 5,530,896 A | * | 6/1996 | Gilbert | 395/829 |
| 5,570,085 A | * | 10/1996 | Bertsch | 340/825.07 |
| 5,621,662 A | * | 4/1997 | Humphries et al. | 700/276 |
| 5,694,335 A | | 12/1997 | Hollenberg | 364/514 C |
| 5,706,191 A | * | 1/1998 | Bassett et al. | 700/9 |
| 5,710,712 A | * | 1/1998 | Labun | 364/492 |
| 5,714,933 A | | 2/1998 | Le Van Suu | 340/568 |
| 5,729,596 A | | 3/1998 | Reeder et al. | 379/102.04 |
| 5,748,083 A | * | 5/1998 | Rietkerk | 340/568 |

(Continued)

FOREIGN PATENT DOCUMENTS

EP 0113533 A2 7/1984 .......... G08B 13/00

(Continued)

Primary Examiner—Toan N. Pham
(74) Attorney, Agent, or Firm—Dicran Halajian

(57) ABSTRACT

This invention provides the framework of a security system that is property specific as well as area specific. The invention includes a distributed software controlled security system that monitors and assesses the status of individual property items and conventional area security devices within a secured area. The activation of an alarm and the action taken in response to the alarm are determined by the state of the secured area, the state of the individual property item, and rules associated with each state or combination of states. Depending upon the capabilities of the individual property items, or appliances, and the area security devices, the security capabilities of this invention are distributed amongst a variety of appliances. In a preferred embodiment, the communication of messages and signals among the components of the system is in accordance with existing or proposed standards, such as HAVi and Home API, thereby allowing interoperability among components of varying vendors.

14 Claims, 2 Drawing Sheets

U.S. PATENT DOCUMENTS

| | | | | |
|---|---|---|---|---|
| 5,815,086 A | * | 9/1998 | Ivie et al. | 340/825.52 |
| 5,875,395 A | * | 2/1999 | Holmes | 455/420 |
| 5,877,957 A | * | 3/1999 | Bennett | 700/86 |
| 5,898,831 A | | 4/1999 | Hall et al. | 395/187.01 |
| 6,005,476 A | * | 12/1999 | Valiulis | 340/310.01 |
| 6,032,202 A | * | 2/2000 | Lea et al. | 710/8 |
| 6,218,931 B1 | * | 4/2001 | Asghar et al. | 340/310.02 |

FOREIGN PATENT DOCUMENTS

| | | | | |
|---|---|---|---|---|
| EP | 0852367 A2 | 7/1998 | | G08B 13/14 |
| EP | 0932275 A2 | 7/1999 | | H04L 12/28 |
| GB | 2162978 A | 2/1986 | | H03J 9/06 |
| GB | 2304952 A | 3/1997 | | G05B 15/02 |

\* cited by examiner ically activity
DISTRIBUTED SOFTWARE CONTROLLED THEFT DETECTION This application claims the benefit of U.S. Provisional Application No. 60/100,826, filed Sep. 17, 1998.

BACKGROUND OF THE INVENTION

1. Field of the Invention

This invention relates to the field of security systems, and in particular to the field of distributed software controlled security systems.

2. Description of Related Art

Security systems are conventionally structured to protect an area. Sensors and other security devices are placed about an area to detect unauthorized access or trespass. Video cameras provide a view of the protected area; entry and exit portals report unauthorized openings or trespassing; motion sensor report unexpected movements; and so on. These systems are particularly well suited for protecting environments that have specific periods of expected inactivity. For example, a home security system is typically activated during the periods that the residents are absent or sleeping; the bulk of a business' security system is activated when the business is closed. The security of an area during periods of routine activity is particularly problematic. In most environments, the security of an area during periods of routine activity requires a conscious monitoring of the images from video cameras, personal patrolling of the area, and the like.

Some security systems, such as automobile alarms, are property specific, rather than area specific. These systems, however, typically operate as mobile area security systems. That is, an automobile alarm uses the same area protection scenario as a house alarm: unauthorized entry and unexpected motion during periods of expected inactivity. Some automobile security systems include an ability to report the automobile's location to a remote monitoring station, but in general automobile security systems are self contained and rely upon the activation of visual and audio attention-getting signals to encourage a potential thief to flee the scene.

In some situations, area security is the primary function of a security system, but in most cases, property security is the true function of an area security system. That is, for example, an area alarm system that detects motion in or around a swimming pool is intended to prevent harm to children or pets who may not appreciate the danger associated with the area. On the other hand, an area alarm system that detects motion in or about an office is intended to prevent theft of the items within the office. As noted above, the use of an area alarm system to protect property within the area has inherent limitations, particularly during periods of routine activity in that area.

Furthermore, the use of area security strategies for property security effects the same security measures, regardless of the status of the environment or the status of the individual property items. Entering an office to vacuum the floors is treated in the same manner as entering an office to steal a computer. If the area security system is armed, either entry will cause an alarm to be sounded; if the area security system is disarmed, neither entry will effect an alarm. Similarly, opening a car door while it is parked in a garage at home on a Saturday afternoon is treated in the same manner as opening the car door in the garage at 3 a.m. in the morning.

BRIEF SUMMARY OF THE INVENTION

It is an object of this invention to provide a security system that is property specific as well as area specific. It is a further object of this invention to provide an integration of each of the security and alarm systems within a particular environment. It is a further object of this invention to provide a framework for a customizable and scalable security system. It is a further object of this invention to make use of the functionalities distributed in a network of interconnected devices.

These objects and others are achieved by having each secured device communicate a status report to a distributed information processing system that receives and processes the report to determine whether to signal an alarm, and the actions to be taken in response to the alarm. In a preferred embodiment, the system also includes communications with area security devices. The activation of an alarm and the action taken in response to the alarm is determined by the state of the secured area, the state of the individual secured device, and rules associated with each state or combination of states.

Preferably, the devices that are being protected are also the devices that form the information processing system. The secured devices are interconnected via, for example, a home network, and have various levels of processing power onboard. Depending upon the capabilities of the secured devices, the security capabilities of a system in accordance with this invention are distributed among multiple devices. Devices having the ability to process status reports receive and process status reports from other devices being secured. In dependence upon the set of rules specific to a secured device, the processing device determines whether the status indicates a cause for alarm, and if so, determines the actions to be taken, such as sounding an audible alarm, contacting security personnel, and so on. By providing a software based framework, the security system in accordance with this invention is highly flexible and versatile. By distributing the processing of status reports among devices, the security system in accordance with this invention is highly robust and reliable.

In a preferred embodiment, the communication of messages and signals among the components of the system is in accordance with existing or proposed standards, such as the Home API (Application Program Interface) and HAVi (Home Audio Video Interoperability) standards, thereby allowing interoperability among components of varying vendors.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
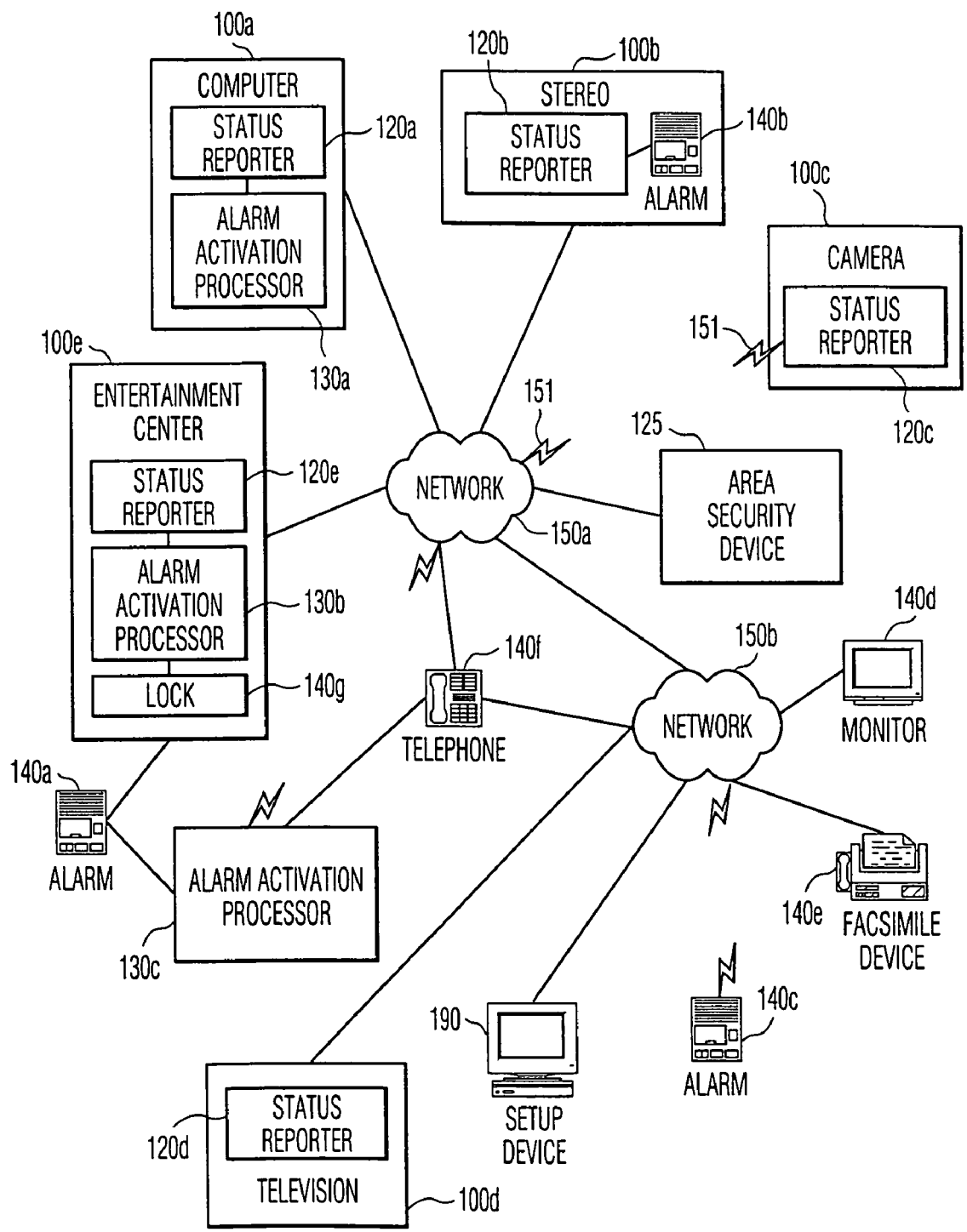
FIG. 1 illustrates an example block diagram of a security system in accordance with this invention.
Figure 2:
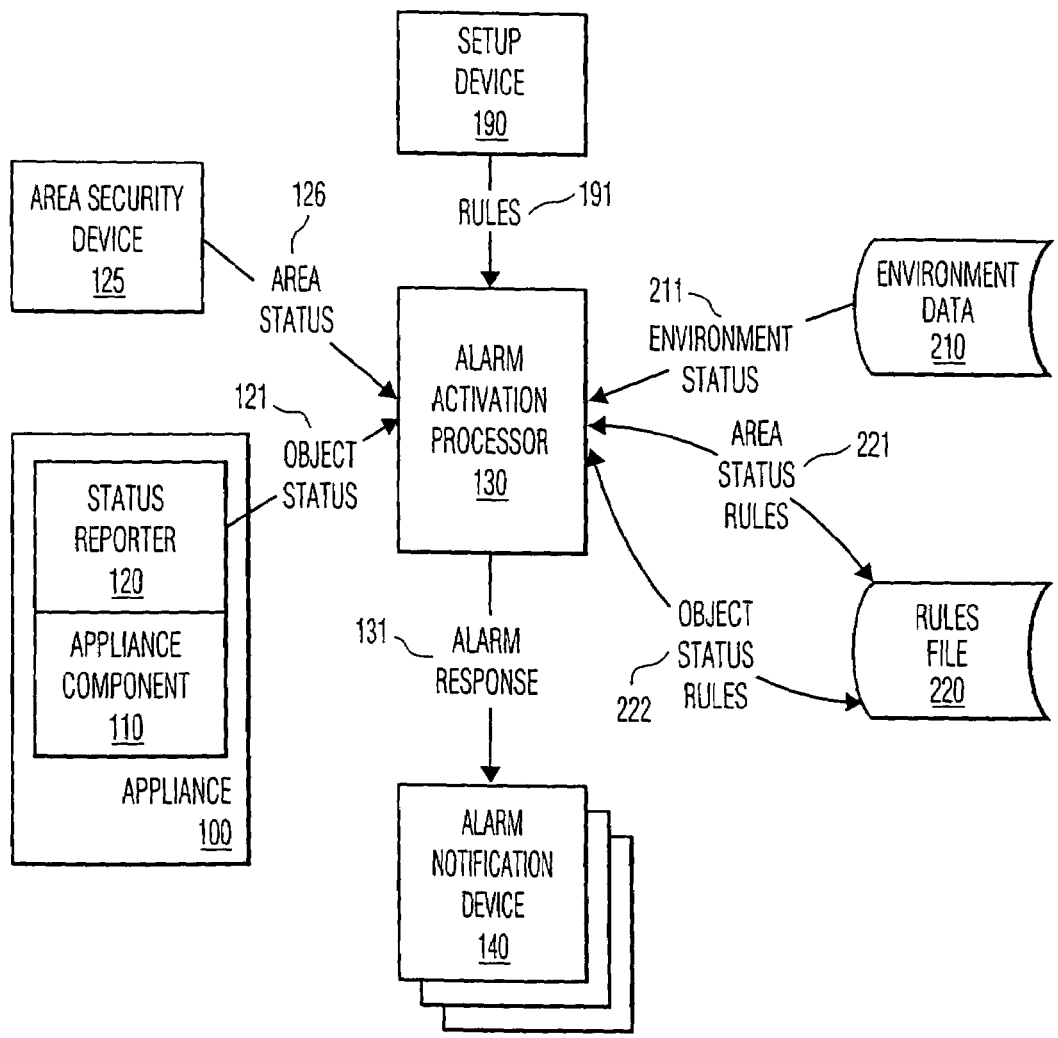
FIG. 2 illustrates an example data flow diagram of an example security system in accordance with this invention.

FIG. 1 illustrates an example block diagram of a security system in accordance with this invention. The example security system comprises property items 100 having status reporters 120 that communicate via a network 150 to alarm activation processors 130 and notification devices 140. In a preferred embodiment, activation processors 130 and notification devices 140 are intelligent components of the property items 100 as well. FIG. 2 illustrates an example data flow diagram of the example security system in accordance with this invention, using the same reference numerals as in FIG. 1. For ease of reference, the instances of referenced components are annotated with a lowercase letter a, b, c, etc. appended to the reference numerals 100, 120, 130, 140, and 150.

The property items 100 of FIG. 1 and FIG. 2 are items warranting security protection, such as personal computers, televisions, entertainment centers, VCRs, DVD players, camcorders, and the like. Increasingly, consumer products and home appliances include capabilities for remote or network access. Standards have been developed to allow these products and devices to communicate with each other. For example, systems are available that mute the sound from a television when a telephone is in use, or tune a stereo receiver to correspond to a television broadcast, and so on. A proposed standard for manufacturers of audio-visual electronic devices is the Home Audio-Visual interoperability (HAVi) standard. Another standard is the Home API standard that defines common interface standards used by software applications to communicate with such devices. U.S. Ser. No. 09/146,020, filed Sep. 2, 1998 for Yevgeniy Shteyn for LOW DATA-RATE NETWORK REPRESENTED ON HIGH DATA-RATE HAVi-NETWORK, and U.S. Ser. No. 09/165,683, filed Oct. 2, 1998 for Yevgeniy Shteyn for CALLS IDENTIFY SCENARIO FOR CONTROL OF SOFTWARE OBJECTS VIA PROPERTY ROUTES, present techniques and devices for communicating in accordance with these standards, and are incorporated by reference herein. Consistent with the standards in this field, the term "appliance" is used herein to designate any device that performs a function. The HAVi standard specifies a common set of communications capabilities within each appliance, and a software framework for effecting their interoperability. The appliances having these communications features are often those appliances warranting security protection. This invention provides a distributed software framework designed to secure these appliances from theft, and in some cases, unauthorized access. Preferably, the interconnected devices and appliances are enabled to monitor each other, thus providing a self-sufficient security system.

In accordance with this invention, in addition to an appliance component 110, each appliance 100 includes a status reporter 120 that communicates messages regarding the status 121 of the appliance 100, as illustrated in FIG. 2. As defined herein, the appliance component 0.110 is that component that provides the intended function of the device; for example, the appliance component 110 of a television is the component that receives the transmitted television signal and displays the selected television programs; the status reporter 120 is ancillary to the appliance function.

In the context of this invention, the communicated status 121 of the appliance 100 is used as a direct or indirect indication of the security status of the appliance 100. For example, the appliance 100a is illustrated as a personal computer, and the status reporter 120a within the computer 100a reports an "I'm OK", or "I am appliance XYZ", message periodically. The absence of an expected "I'm OK" message from the status reporter 120a could be cause for an alarm. Similarly, the appliance 100b may be a stereo set that responds to a prompt signal from an alarm activation processor 130 with an acknowledgment signal 121. The appliance 100c may be a camera that periodically transmits an identifiable pulse, or heart-beat. Again, the absence of an expected heart-beat or acknowledgment signal could be cause for an alarm. The appliance 100d may be a television with a tilt-detector, such as a mercury switch, and the status reporter 120d in the television 100d sends a signal or message whenever the switch is closed. A signal indicating a tilting movement of the television 100d could be cause for an alarm. That is, the signal in this implementation is generated in an exception situation, in contrast to the periodic heart-beat or "I'm OK" messaging.

In accordance with this invention, and as detailed in FIG. 2, the item status 121 is communicated to one or more alarm activation processors 130. At least one of the alarm activation processors 130 includes a set 222 of rules and parameters for determining whether a given item status 121 warrants an alarm response 131. The alarm response 131 includes the activities that should occur in response to the item status 121. For example, the alarm activation processor 130 that contains the rules 222 for the aforementioned personal computer 100a, for example processor 130c in FIG. 1, may respond to these rules 222 by checking a sign-out database to determine if an authorized person has acknowledged responsibility for removing the computer 100a. If so, the alarm activation processor 130c does not initiate an alarm response 131. If no one has signed out the computer 100a, the alarm activation processor 130c may effect different responses 131, depending for example upon the time of day. The rules 222 associated with the computer 100a at processor 130c may instruct the immediate sounding of an audible alarm 140a if the absence is first detected after normal business hours, but instruct that a telephone 140f call be placed to a department manager if the absence is first detected during business hours. If the department manager authorizes the absence, the alarm activation processor 130c annotates the rules 222, or its internal database (not shown), to stop expecting signals from the computer 100a. As used herein, the term database includes an organized storage of data, including files, data structures, state memory, and the like. When the item status report 121 from the computer 100a indicates that the computer 100a is returned, the annotation is removed, and the alarm activation processor 130c resumes the processing of item status reports 121 from the computer 100a according to the original rules 222.

The item status report 121 is communicated to the network 150, and any alarm activation processor 130 can be configured to receive and process the report 121 from particular report detectors 120. As would be evident to one of ordinary skill in the art, in a preferred embodiment, the alarm activation processor 130 is best implemented as a software program executing on a computing device. If an appliance 100 contains a computing device, the alarm activation processor 130 can be implemented as a part of the appliance 100; alternatively, special purpose alarm activation processors such as 130c may be provided. In the example above, the appliance 100a is a personal computer, and contains the ability to perform the functions of an alarm activation processor 130, as indicated by the alarm activation processor box 130a in FIG. 1. The alarm activation processor 130a may process the status reports 121 from the status reporter 120a, but such processing may have a minimal security impact, because a disabling of the computer 100a would likely disable the alarm activation processor 130a. In a preferred embodiment of this invention, as discussed above, another alarm activation processor 130c is configured to process the status reports 121 from the status reporter 120a of the computer 100a. In this manner, if a thief tampers with the computer 100a, for example, by first disconnecting power from it, the other alarm activation processor 130c notes the absence of a report from the computer 100a and reacts accordingly. In like manner, the computer 100a processes the status reports 121 from other status reporters 120b–120e. In like manner, multiple alarm activation processors 130 may be configured to process the status reports from the same appliance 100, thereby providing for redundant alarm paths. In a preferred embodiment, the multiple alarm activation processors 130 communicate with each other via the network 150, and the processing of the rules at each of the multiple alarm activation processors 130 is also dependent upon these communications, thereby optimizing the security protection provided to the appliances 100 while minimizing redundant alarm responses 131.

If the alarm activation device determines that the status report 121 indicates a cause for alarm, or a possible cause for alarm, it generates one or more alarm responses 131 as illustrated in FIG. 2. As discussed above, the particular response and events that are activated by the alarm activation processor 130 in response to the status report 121 may be a function of the status 211 of the environment 210, such as the time of day, day of the week, interim annotations to the rules, and the like. These events are effected by communicating messages or signals to one or more alarm notification devices 140. These notification devices 140 may include audible alarms 140a, 140b, 140c, security monitors 140d, communications devices 140e, 140f, and the like. The term notification device is used herein for ease of understanding; the devices 140 may be any device that reacts to an alarm response 131, such as a security camera, a locking device, and so on. These devices 140 may be connected directly to the alarm activation processor 130, such as device 140a, connected directly to the network 150, such as device 140d, or connected to both, 140f. These devices may be contained within appliances being secured, such as 140b, or remotely located, such as 140c.

Also illustrated in FIGS. 1 and 2 is an area security device 125. The area security device 125 detects security breaches of an area and may be, for example, a motion reporter, a sound reporter, a heat reporter, a light reporter, a portal switch, or a combination of such devices. The area security device 125 communicates an area security status 126 via the network 150. In response to the area status report 126, one or more of the alarm activation processors 130 will assess the area status report 126 in relation to a set of rules 221 associated with the area security device 125, and react accordingly, as discussed above. In accordance with this invention, the area status report 126 may also affect the set of rules 222 associated with the appliances 100 as well. In the event of a physical breach of security, for example, each of the alarm activation processors 130 may be directed to sound an immediate alarm if a questionable status, such as the tilting of the television 100d, regardless of the original rules 222. Alternatively, each set of rules 222 may contain explicit rules to be effected in the event of a physical breach of security. For example, an appliance 100 containing sensitive information may be directed to shut down or enter a secure mode whenever an area status 126 reports a breach. Similarly, an entertainment center 100e may be directed to enter a lock mode, wherein a combination code must be subsequently coded into the entertainment center 100e before it can be operated again, thereby minimizing the value of the entertainment center 100e to a potential thief who does not have access to the combination code.

The alarm activation processors 130 may effect any number of actions, or inactions, in response to item status 121 and area status 126 reports. As illustrated in FIG. 1, possible alarm response activities include sounding an audible or visible alarm 140a, 140b, 140c, sending a message to a security monitor 140d or a facsimile device 140e, placing a telephone call 140f, and other means of effecting a response to an alarm, or potential alarm, condition. Similarly, an item status report 121 could affect the operation of the area security device 125, such as arming the area security device 125 whenever a potential theft is detected. In like manner, an area security device 125 such as a video camera can be directed to provide a view of a particular area in response to an item status report 121. As also illustrated in FIG. 1 the communications among the components of the security system may be by direct connection, as indicated by the solid lines among components, or by wireless connection, as indicated by the radiation symbols 151 among components.

Also shown in FIGS. 1 and 2 is a setup device 190 for creating, editing, and compiling the rules 191 that are stored in a rules file 220. In a straightforward implementation, the rules 191 are conventional condition-action rules. If the condition is true, the action is effected. The condition may include multiple boolean expressions, with dependencies on internal and external events and environmental parameters 211, such as the time of day, whether some precondition has been met, and so on. The condition of the rule 191 may include a reference to a software object that returns a boolean value; as such, the condition may be programmed via the software object to effect any evaluation, analysis, or query required to determine a true/false result. For example, the software object may be an artificial intelligence object such as a knowledge based system, an expert system, or a learning system. Such systems may assign different weights to the parameters contained in the rules based on the environment or prior alarm history to reduce the occurrence of false alarms while maintaining the security integrity of the appliance. If the condition test is true, the associated action in the rule 191 is performed. Default rules may also be associated with appliances 100 that do not have specific rules. In a preferred embodiment, the default rule initiates an alarm response 131 whenever the status reports 121 cease. Additionally, appliances 100 may be classified by security classes, each security class having different default rules. For example, a security class may be defined for items that are routinely removed from the security system during certain hours, and the alarm response 131 to a cessation of reports from appliances in this class during these periods is merely an entry in a log, rather than the sounding of an audible alarm.

The alarm response 131 may be a sequence of tasks, a set of simultaneous tasks, or a combination of both. In most cases, the action is a simple task, such as "sound audible alarm", "call the police", and the like. The action may also include a reference to a software object; as such, the action can be programmed to effect both simple and complex task assignments. For example, the action may be the following sequence of tasks: send e-mail to abc@def.com containing the received item status report; wait for response; if no response within 5 minutes, dial 911 and play recorded message #7, else, execute the program named in the response. In this scenario, an operator at e-mail address abc@def.com could instruct the alarm activation processor 130 to execute any one of a number of predefined programs by responding to the email message with the name of the program that is to be executed. Similarly, the operator could attach a program to the response, and the rule structured to execute the program that is attached to the received message from abc@def.com.

The individual tasks in the determined action are effected by communicating messages, or alarm responses 131 to alarm notification devices 140. The alarm notification devices 140 of FIG. 1 are symbolic representations of devices that perform the functions called for by the alarm responses 131. For example, the telephone 140f symbolizes the mechanism used to place a telephone call, the facsimile device 140e symbolizes the mechanism used to send a fax, the lock 140g symbolizes a mechanism used to prevent subsequent access to the item 10e, and so on. As would be evident to one of ordinary skill in the art, the alarm activation processor 130 could include the capabilities to effect the alarm notification functions as well. That is, for example, personal computers typically contain programs that send e-mail, voice-mail, and facsimile messages directly. Also as shown in FIG. 1, the alarm activation processors 130b, 130c may directly communicate with an alarm notification device 140a, or, any alarm activation device 130 may communicate via the network with alarm notification devices 140b–140g that are connected to the network.

As would be evident to one of ordinary skill in the art, a variety of means for indicating a potential problem are feasible. For example, as discussed above, a status reporter 120 may transmit a continuous or periodic message 121 whenever a non-problem status is present, and cease transmission whenever a problem state occurs. That is, the cessation of transmission of messages is a communication of an item status 121, equivalent to an expressed "I'm not OK" message. The rules 191 in this example are structured to sound an alarm if the message 121 is not received at the expected time. By using this approach, an alarm response 131 will be effected whenever power is removed from the status reporter 120. In like manner, a combination of express and implicit indications of a detected problem can be encompassed by the rules 191. For example, a particular log out sequence may cause the status report to contain one state, and thereafter all subsequent reports will be dependent upon that prior reported state. In like manner, the reporter 120 may be a location sensor or a proximity reporter that detects a distance of an item from a reference point, or a wireless transmitter with a limited range that is attached to an item 100 such as a car, and transmits an identification of the item. When the item is detected to have gone beyond a given range, or is no longer detected, a cause for alarm is assessed by the alarm activation processor 130. Conversely, the rule for the item 100 could be such that the presence of the item 100 within a range of a reference point is a cause for alarm, thereby providing a warning of an unauthorized presence, rather than an unauthorized absence.

In a preferred embodiment, the setup device 190 or one or more of the alarm activation devices 130 include an ability to register and de-register appliances 100 and reporters 120 from the security system. In a wired network, for example, the attachment of a reporter 120 to the network initiates a log-in process wherein the reporter 120 identifies itself and its capabilities, including whether the appliance 100 contains an alarm activation processor 130 or notification devices 140. The rules files 220 associated with the appliances 100 are communicated to alarm activation processors 130 in the network 150, as required. In a wireless network, log-in beacons are often used to query whether new devices are in the area, or to request entry into an established net. The protocol for registering and de-registering items from a home or office communications networks will typically be contained in the aforementioned standards, such as the Home API (Application Program Interface) and HAVi (Home Audio Video Interoperability) standards. By conforming to a standard, components from a variety of vendors will be able to communicate with each other; and, by formulating a common format for item status reports 121, rules 191, and responses 131 in accordance with this invention, security networks will be able to be established with minimal overhead burden.

In a preferred embodiment of this invention, the rules 191 are stored in a rules file 220, typically via one or more of the alarm activation processors 130. Each alarm activation processor 130 has access to the rules file 220 associated with each status reporter 120 or area security device 125 for which the alarm activation processor 130 is responsible. For clarity, the rules 191 are illustrated as being stored and retrieved in the rules file 220 as either item status rules 222 or area status rules 221, although some rules 191, as discussed above, may be both item and area status dependent. Depending upon the rules 191 in the rules file 220, and the capabilities of the alarm activation processor 130, the alarm activation processor may also have access to environment data 210. The environment data 210 includes such data as the time of day, whether the area being secured is expected to be vacant, whether local security personnel are present, and the like. The environmental data 210 may also include an indication of a general power outage, so that individual alarm responses 131 are not generated for each reporter 120 that subsequently ceases transmissions or expressly reports an absence of power.

The foregoing merely illustrates the principles of the invention. It will thus be appreciated that those skilled in the art will be able to devise various arrangements which, although not explicitly described or shown herein, embody the principles of the invention and are thus within its spirit and scope. For example, in the context of security systems, events other than the presence or absence of an appliance can cause an alarm. For example, an appliance 100 may be a refrigerator with a temperature reporter 120; an increase in temperature in the refrigerator could be cause for an alarm. Similarly, the invention is presented herein in the context of a network 150, although the principles and techniques of this invention are equally applicable to directly connected devices and components.

The functions discussed herein may be implemented in hardware, software, or a combination of both. The partitioning of functions as illustrated in FIGS. 1 and 2 are presented for illustration purposes. As evident to one of ordinary skill in the art, and as discussed herein, other partitionings and optimizations are feasible, and well within the spirit and scope of this invention.

I claim:

1. A home or office security system comprising:
  a network via which a plurality of appliances communicate to effect a control of one or more appliances of the plurality of appliances,
  a first appliance of the plurality of appliances having:
    a first appliance component that is configured to effect a primary function of the first appliance that is independent of security, and
    a status reporter that is configured to communicate a status of the first appliance via the network; and
  an alarm activation processor, operably coupled to the status reporter, that is configured to receive the status, and to effect an alarm response dependent on the status, wherein:
  a second appliance of the plurality of appliances includes a second appliance component for effecting a second primary function independent of security; and the alarm activation processor is integrated in the second appliance.

2. The system of claim 1, wherein:
the status reporter and the alarm activation processor each comprise a respective HAVi-compliant module to facilitate communicating the status via the network.

3. The system of claim 1, wherein:
the status reporter and the alarm activation processor each comprise a respective Home API-compliant module to facilitate communicating the status via the network.

4. The system of claim 1, further including:
a third appliance having a second alarm activation processor, operably coupled to the status reporter via the network, for receiving the status and effecting a second alarm response dependent on the status.

5. The system of claim 4, wherein
the second alarm response is also dependent upon a status of the second appliance.

6. The system of claim 4, wherein
the alarm activation processor is further configured to effect the alarm response in further dependence upon a rule base that is associated with the first appliance, and
the second alarm activation processor is further configured to effect the second alarm response dependent upon a second rule base associated with the first appliance.

7. A home or office security system comprising:
a network via which a plurality of appliances communicate to effect a control of one or more appliances of the plurality of appliances,
a first appliance of the plurality of appliances having:
a first appliance component that is configured to effect a primary function of the first appliance that is independent of security, and
a status reporter that is configured to communicate a status of the first appliance via the network;
an alarm activation processor, operably coupled to the status reporter, that is configured to receive the status, and to effect an alarm response dependent on the status; and
an area security devices that is configured to detect an area status of an area;
wherein:
the activation processor is also operably coupled to the area security device and is further configured to effect the alarm response dependent on the area status.

8. A home or office security system comprising:
a network via which a plurality of appliances communicate to effect a control of one or more appliances of the plurality of appliances,
a first appliance of the plurality of appliances having:
a first appliance component that is configured to effect a primary function of the first appliance that is independent of security, and
a status reporter that is configured to communicate a status of the first appliance via the network; and
an alarm activation processor, operably coupled to the status reporter, that is configured to receive the status, and to effect an alarm response dependent on the status, wherein
the alarm activation processor is further configured to effect the alarm response in further dependence upon a rule base that is associated with the first appliance.

9. An electronic appliance for use in a security system, the appliance comprising:
an appliance component that is configured to effect a primary function independent of security;
an interface to a network that facilitates a control of the appliance component via communications on the network; and
a status reporter that is configured to communicate a status of the appliance via the network;
wherein the security system has an alarm activation processor operably coupled to the status reporter via the network for receiving the status and effecting an alarm response dependent on the status, and wherein the status reporter is HAVi compliant.

10. An electronic appliance for use in a security system, the appliance comprising:
an appliance component that is configured to effect a primary function independent of security; and
an interface to a network that facilitates a control of the appliance component via communications on the network,
a status reporter that is configured to communicate a status of the appliance via the network;
wherein the security system has an alarm activation processor operably coupled to the status reporter via the network for receiving the status and effecting an alarm response dependent on the status, and wherein the status reporter is Home API compliant.

11. An electronic appliance for use in a security system, the appliance comprising:
an appliance component that is configured to effect a primary function independent of security;
an interface to a network that facilitates a control of the appliance component via communications on the network; and
an alarm activation processor that is configured to effect an alarm response dependent on a status received from a status reporter of an other appliance via the network, wherein the alarm activation processor is HAVi compliant.

12. An electronic appliance for use in a security system, the appliance comprising:
an appliance component that is configured to effect a primary function independent of security;
an interface to a network that facilitates a control of the appliance component via communications on the network; and
an alarm activation processor that is configured to effect an alarm response dependent on a status received from a status reporter of an other appliance via the network, wherein the alarm activation processor is Home API compliant.

13. An electronic appliance for use in a security system, the appliance comprising:
an appliance component that is configured to effect a primary function independent of security;
an interface to a network that facilitates a control of the appliance component via communications on the network; and
an alarm activation processor that is configured to effect an alarm response dependent on a status received from a status reporter of an other appliance via the network, wherein
the alarm activation processor is also operably coupled to an area security device that provides an area status, and the alarm response is further dependent on the area status.

14. An electronic appliance for use in a security system, the appliance comprising:

an appliance component that is configured to effect a primary function independent of security;

an interface to a network that facilitates a control of the appliance component via communications on the network, and an alarm activation processor that is configured to effect an alarm response dependent on a status received from a status reporter of an other appliance via the network, wherein the alarm activation processor is further configured to effect the alarm response in dependence upon a rule base that is associated with the other appliance.

\* \* \* \* \*